Dec. 7, 1965  E. H. CUMPSTON, JR  3,221,999
MATERIAL REFINING MACHINE
Filed Dec. 11, 1962  2 Sheets-Sheet 1

INVENTOR.
EDWARD H. CUMPSTON, JR.
BY
*Edward H Cumpston*
HIS ATTORNEY

Dec. 7, 1965     E. H. CUMPSTON, JR     3,221,999

MATERIAL REFINING MACHINE

Filed Dec. 11, 1962     2 Sheets-Sheet 2

INVENTOR.
EDWARD H. CUMPSTON, JR.

BY

HIS ATTORNEY

United States Patent Office 3,221,999
Patented Dec. 7, 1965

3,221,999
MATERIAL REFINING MACHINE
Edward H. Cumpston, Jr., Bronxville, N.Y.
(43 Monument Ave., Old Bennington, Vt.)
Filed Dec. 11, 1962, Ser. No. 243,860
14 Claims. (Cl. 241—247)

This invention relates to apparatus for handling and processing or treating of high viscosity materials such as chemical compounds, adhesives, polymers, high consistency mixtures of solids and liquids, paper making pulp and the like, being an improvement on my patents, Nos. 2,722,163, 2,824,500 and 2,978,192.

The present machine has container means including a cylindrical chamber with an inlet at one end and an outlet at the other. A cylindrical rotor, of slightly less diameter than the chamber, is mounted coaxially inside the chamber to provide a restricted annular space therebetween where the material is refined and mixed between the inner rotating surface of the rotor and the outer stationary surface of the chamber. Material is fed into this annular space through a concentric circular inlet opening in one end wall of the chamber, the opening being smaller in diameter than the inside diameter of the chamber. Material is prerefined and forced radially outward from this circular opening between rotating radial bars mounted, respectively, on the end of the rotor and stationary radial bars mounted on the inside of the adjacent chamber end wall. On reaching the inside diameter of the chamber, the material is turned through a 90° angle and fed through the annular space between the chamber and rotor, to the outlet opening which covers a portion of the chamber periphery, thus offering no restriction to the material flow. The rotor is mounted on a shaft which is held in bearings at opposite ends of the chamber, a drive motor being connected to one end of this shaft.

The cylindrical rotor has helical channels or grooves similar to a screw thread cut in its surface. The rotor is turned in the proper direction so these grooves feed material toward the outlet. The chamber has channels or grooves similar to a screw thread of the opposite hand, cut in its cylindrical surface, and these grooves assist in feeding and spinning material toward the outlet. The coaction of these grooves or threads of the rotor and chamber mixes, refines, and feeds the viscous material.

The surface speed of the rotor is made too high however, for it to act as an ordinary screw conveyor. Instead, the rotor groves throw material outwardly by centrifugal force, where the material is caught by the chamber grooves. Only when the chamber grooves are packed full will the rotor grooves begin to feed material. When pressure from the inlet forces material into the rotor grooves, this material is accelerated, forced outwardly and exchanged for stationary material previously held in the chamber grooves. When spinning material is thus thrown from the rotor grooves into the chamber grooves, it is fed toward the outlet, sheared off from contact with the rotor and brought to a stop by friction against the chamber grooves and mixed with the material therein. The chamber grooves or threads can be more open and rounded than the rotor grooves or threads to facilitate the exchange of material between the fully packed chamber and self-cleaning rotor. The machine is self-stabilizing because, when nearly empty there is little or no feeding of material, but when more material is forced into the inlet, both grooved or threaded members begin to feed material toward the outlet and thus maintain a substantially constant level in the machine. The rotor grooves feed when material is forced into them and the chamber grooves feed when the rotor has sufficient grip to begin to spin the material through them. As the material input rate goes up, the power requirement of the machine goes up, but the amount of material in the machine tends to remain constant, as does the refining and mixing work done on the material.

One object of the invention is to provide a more simple, efficient and reliable machine of the character described, for circulating high viscosity materials, mixing them, adding or subtracting heat, mechanically refining them and promoting chemical reactions between them and gases, liquids or solids.

Another object is to provide such a machine adapted for efficient processing of highly viscous material so that carrying fluids can be kept to a minimum, since such fluids act to prevent effective mechanical refining and treatment of the carried solids, waste operating power and heat, delay chemical reactions, waste chemicals and may require subsequent removal.

A further object is the provision of such a machine which is readily adapted for use either as a high throughput, low horsepower mixer or as a lower throughput, high horsepower mechanical refiner, by changes in size, shape and pitch of the helical grooves or threads of the rotor and chamber.

A further object is to provide such a machine having its throughput automatically coupled to the infeed rate, so as to afford stability in operation.

Still a further object is to supply a machine having the above advantages in a construction which is inexpensive to build and simple and durable in operation.

Figure 1:
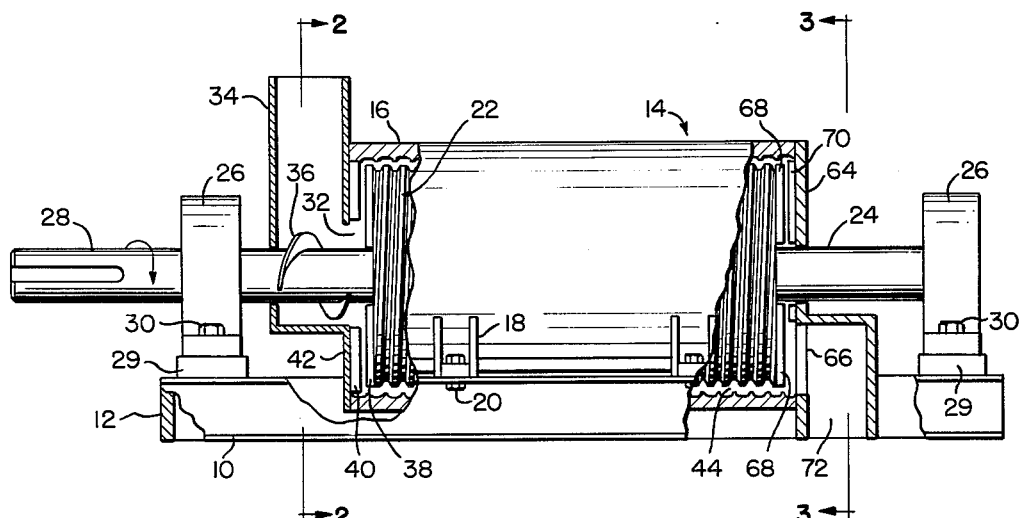
FIG. 1 is a side elevation, partly in section and partly broken away, of one machine embodying the present invention.

FIG. 1 shows the general arrangement of the machine, comprising a supporting frame base welded together from two channels 10 interconnected by cross plates 12. The container shown generally at 14 comprises a chamber 16 mounted on the base by brackets 18 and bolts 20. The rotor 22 is carried and turned by a shaft 24 which is supported at its ends in bearings 26 on the frame. One end 28 of the shaft is provided for connection to a driving motor. The bearings 26 are supported on plates 29 welded to the base 10 and held in place by bolts 30.

Figure 2:
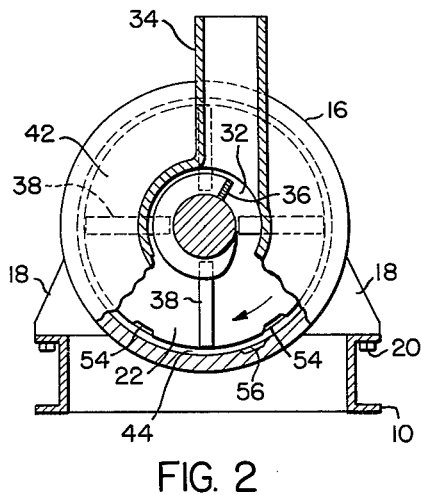
FIG. 2 is an end elevation of the machine partly broken away and partly in section on the line 2—2 in FIG. 1.

The circular inlet opening 32, FIGS. 1 and 2, is enclosed by a gravity fed hopper 34 and has the material fed to it by a screw conveyor 36 fixed on shaft 24. Conveyor 36 being smaller in diameter than rotor 22 has a slower surface speed and thus preferably acts more like a normal screw conveyor than does the rotor.

Rotor 22 carries radial bars 38 on its inlet end wall which turn in close proximity to stationary bars 40 mounted on end wall 42 of the chamber. The coaction of these bars serves to prerefine the material, break up lumps and by centrifugal action, force the material into the annular space 44 between the periphery of the rotor and the cylindrical surface of the chamber.

Figure 3:
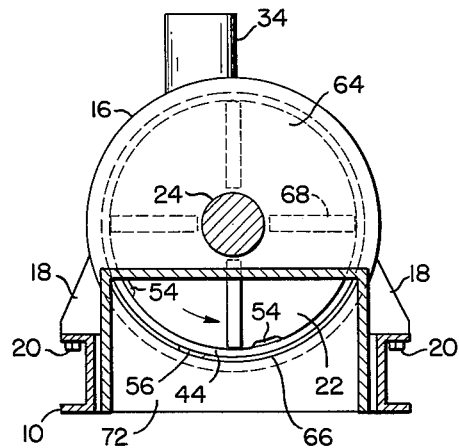
FIG. 3 is a similar view on the line 3—3 in FIG. 1.
Figure 4:
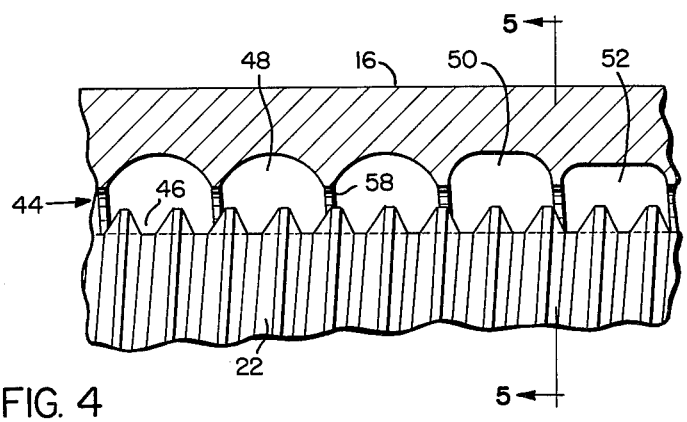
FIG. 4 is an enlarged fragmentary side elevation, partly in longitudinal section, showing one form of rotor and chamber grooves.

A typical arrangement is shown in FIG. 4 where the grooves 46 have the form of "acme" screw threads. The greater surface area of the rotor grooves 46 is evident, as is the ease with which stationary material in the chamber grooves can be displaced by impact from material discharged from the rotor grooves 46. The actual curvature of the chamber grooves 48 may be varied as shown at 50 and 52 in FIG. 4, to meet specific operating conditions. Multiple groove leads 54 and 56 (FIGS. 2 and 3) are used to give the desired thread pitch for both the rotor and chamber grooves. The greater the pitch and the larger the grooves the greater the material throughput rate and the lower the power demand. The lands 58 between the thread grooves are made as narrow as practicable, consistent with wear resistance and strength.

Figure 5:
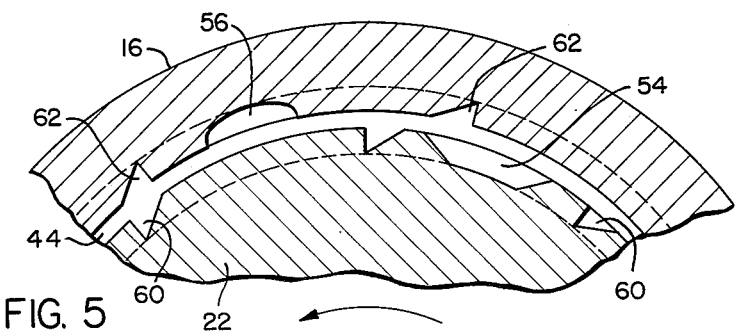
FIG. 5 is an enlarged fragmentary sectional elevation on the line 5—5 in FIG. 4.

Axially extending grooves 60 and 62, in the rotor and chamber surfaces, are shown in FIG. 5. These can be cut in either or both the rotor and chamber groove walls or threads to increase the surface area for heavy mechanical refining of very viscous materials and these grooves are tapered away from the direction of material flow to make them self-cleaning.

As here shown and viewed from the input end of the machine, the rotor is driven in a clockwise direction, with its threads or grooves extending in a lefthand or counterclockwise direction, while the threads or grooves of the chamber extend in a right hand or clockwise direction, but it will be understood that these directions are subject to change as conditions may require.

FIGS. 1 and 3 show the outlet construction. The end wall 64 of the chamber is cut away at 66 on its periphery, to give free discharge of material around the bottom third of annular space 44. To prevent the lodging of material and to insure the prompt discharge of material, the surface of this end of the rotor 22 and the adjacent inside of chamber end wall 64 carry radial bars 68 and 70 similar to radial bars 38 and 40 at the inlet end. The outlet is enclosed in a gravity discharge chute 72 which passes between the frame channels.

When it is desired to subject the material being processed to a controlled atmosphere, shaft 24 is provided with any well known sealing mechanism where it passes through inlet hopper 34 and chamber end wall 64. Temperature control of the material is accomplished by adding or subtracting heat from the outside of the chamber wall 16 by circulating water pipes, steam jacket, electrical heaters and the like as well understood in the art. Heat transfer is relatively rapid through the chamber wall and into the tightly packed and well mixed material in the chamber grooves.

Figure 6:
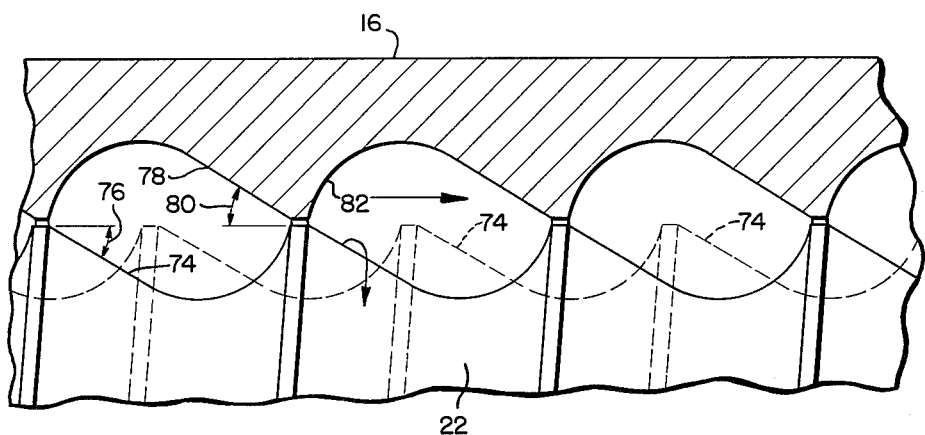
FIG. 6 is a view similar to FIG. 4 but showing modified rotor and chamber grooves.

FIG. 6 shows a modified groove or thread arrangement in which the material propelling face or side wall 74 of the individual grooves of the rotor is flattened and inclined at an angle 76 with the rotor axis, of between 10° and 45°, while the face or side wall 78 of the individual grooves of the chamber toward the outlet, is similarly flattened and inclined at an angle 80 with the chamber axis of between 10° and 45°, as shown. This has the advantage of compressing the material between the substantially parallel faces 74 and 78 of the respective rotor and chamber grooves. Two stages of this compression are shown in full and broken lines as they take place when the rotor turns. Here, as in the above modification, the rotor as viewed from the input end, is turned in a clockwise direction with its threads extending in a left hand or counterclockwise direction while the threads or grooves of the chamber extend in a right hand or clockwise direction, so that the thread-like grooves of the rotor and chamber are of opposite hands.

By compressing the material higher refining and mixing forces are produced, particularly on hard-to-handle materials such as fibrous suspensions. The ratio of compressive forces to throughput forces can be altered by changing angles 76 and 80. As these angles are made smaller the machine horsepower and refining work increase while the throughput decreases. The groove arrangement of FIG. 6 has the further advantage that the propelling or feeding surface 74 of the counterclockwise rotor threads is inclined away from the outlet by an angle 76 with the rotor axis, to reduce rotor feeding action while the clockwise or right hand chamber grooves have a much steeper feeding face 82. Material feeding is thus not pronounced until annular space 44 is full of material and the rotor has sufficient grip to begin spinning material through the chamber grooves. The chamber grooves then become effective feeders and control the throughput rate. By keeping the machine full of material, the retention time is increased and the machine does more work. The groove arrangement of FIG. 6 has less working area than that shown in FIG. 4 and its use is dictated by the flow characteristics of the particular material being handled.

In the foregoing embodiments of the invention, the axial pitch of the rotor grooves is preferably between 0.4 of an inch and 1.5 inches and the axial pitch of the chamber grooves is substantially greater than the axial pitch of the rotor grooves. The axial width of the chamber grooves is preferably from 50% to 300% greater than the width of the rotor grooves. The cylindrical land between the rotor and chamber grooves is preferably less than 0.4 of an inch. The minimum radial clearance between the cylindrical surfaces of the rotor and chamber is preferably from 0.01 to 0.5 of an inch.

A machine embodying the present invention promotes the considerable advantages that are often possible by handling the materials in a highly viscous condition, with carrying fluids kept to a minimum. Such fluids often delay chemical reactions, waste chemicals, waste heat and mixing energy, prevent mechanical refining of the carried solids, and may require costly final removal. Changes in the relative size, shape and pitch of the rotor and chamber threads can be made to alter such a machine from a high throughput, low horsepower mixer to a lower throughput, high horsepower mechanical refiner. Operation is stable since machine throughput is automatically coupled to the infeed rate. The machine is durable in construction, efficient in operation and inexpensive to build.

It will thus be seen that the invention accomplishes its objects and while it has been herein disclosed by reference to the details of preferred embodiments, it is to be understood that such disclosure is intended in an illustrative, rather than a limiting sense, as it is contemplated that various modifications in the construction and arrangement of the parts will readily occur to those skilled in the art, within the spirit of the invention and scope of the appended claims.

I claim:

1. A machine for processing viscous materials comprising a container having therein a chamber with a substantially cylindrical side wall and an inlet at one end and an outlet at the other end thereof, a substantially cylindrical rotor mounted coaxially inside said chamber with its cylindrical side wall adjacently spaced from the side wall of said chamber to leave an annular passageway therebetween, means for rotating said rotor about its axis, means for feeding material into said chamber inlet, the cylindrical side walls of said chamber and rotor being formed with alternating lands and grooves of helical shape and of opposite hands, respectively, to clear but coact with one another to feed said material axially of said chamber, said chamber grooves having a substantially curved shape in cross section, and said rotor being rotated in a direction to produce feeding of said material toward said chamber outlet by the coaction of said grooves of said chamber and rotor, said lands having a radial spacing of between 0.01 and 0.5 inch, and means for discharging said material from said chamber outlet, whereby said material is sheared, mixed, refined and transported through said machine by the continuously crossing coaction of said grooves of said chamber and rotor walls.

2. A machine for processing viscous materials comprising a container having therein a chamber with a substantially cylindrical side wall and an inlet at one end and an outlet at the other end thereof, a substantially cylindrical rotor mounted coaxially inside said chamber with its cylindrical side wall adjacently spaced from the side wall of said chamber to leave an annular passageway therebetween, means for rotating said rotor about its axis, means for feeding material into said chamber inlet, the cylindrical side walls of said chamber and rotor being formed with alternating lands and grooves of helical shape and of opposite hands, respectively, to clear but coact with one another to feed said material axially of said chamber, said rotor grooves having a cross sectional shape substantially that of acme screw threads with intervening ridges formed with angular corners, to increase the surface area and processing action of said rotor, and said rotor being rotated in a direction to produce feeding of said material toward said chamber outlet by the coaction of said grooves of said chamber and rotor, said lands having a radial spacing of between 0.01 and 0.5 inch, and means for discharging said material from said chamber outlet, whereby said material is sheared, mixed, refined and transported through said machine by the continuously crossing coaction of said grooves of said chamber and rotor walls.

3. A machine for processing viscous materials comprising a container having therein a chamber with a substantially cylindrical side wall and an inlet at one end and an outlet at the other end thereof, a substantially cylindrical rotor mounted coaxially inside said chamber with its cylindrical side wall adjacently spaced from the side wall of said chamber to leave an annular passageway therebetween, means for rotating said rotor about its axis, means for feeding material into said chamber inlet, the cylindrical side walls of said chamber and rotor being formed with alternating lands and grooves of helical shape and of opposite hands, respectively, to clear but coact with one another to feed said material axially of said chamber, said rotor grooves being intercepted by grooves formed in substantially axial direction in the cylindrical surface of said rotor to increase the surface area and refining action of said rotor, and said rotor being rotated in a direction to produce feeding of said material toward said chamber outlet by the coaction of said grooves of said chamber and rotor, said lands having a radial spacing of between 0.01 and 0.5 inch, and means for discharging said material from said chamber outlet, whereby said material is sheared, mixed, refined and transported through said machine by the continuously crossing coaction of said grooves of said chamber and rotor walls.

4. A machine for processing viscous materials comprising a container having therein a chamber with a substantially cylindrical side wall and an inlet at one end and an outlet at the other end thereof, a substantially cylindrical rotor mounted coaxially inside said chamber with its cylindrical side wall adjacently spaced from the side wall of said chamber to leave an annular passageway therebetween, means for rotating said rotor about its axis, means for feeding material into said chamber inlet, the cylindrical side walls of said chamber and rotor being formed with alternating lands and grooves of helical shape and of opposite hands, respectively, to clear but coact with one another to feed said material axially of said chamber, said chamber grooves being intercepted by grooves formed in a substantially axial direction in the cylindrical side wall of said chamber to increase the area of said side wall and increase resistance thereby to the movement of said materials along said passageway, and said rotor being rotated in a direction to produce feeding of said material toward said chamber outlet by the coaction of said grooves of said chamber and rotor, said lands having a radial spacing of between 0.01 and 0.5 inch, and means for discharging said material from said chamber outlet, whereby said material is sheared, mixed, refined and transported through said machine by the continuously crossing coaction of said grooves of said chamber and rotor walls.

5. A machine for processing viscous materials comprising a container having therein a chamber with a substantially cylindrical side wall and an inlet at one end and an outlet at the other end thereof, a substantially cylindrical rotor mounted coaxially inside said chamber with its cylindrical side wall adjacently spaced from the side wall of said chamber to leave an annular passageway therebetween, means for rotating said rotor about its axis, means for feeding material into said chamber inlet, the cylindrical side walls of said chamber and rotor being formed with alternating lands and grooves of helical shape and of opposite hands, respectively, to clear but coact with one another to feed such material axially of said chamber, the axial pitch of said rotor grooves being from 0.4 to 1.5 inches to provide both maximum processing surface and space for material circulation, and said rotor being rotated in a direction to produce feeding of said material toward said chamber outlet by coaction of said grooves of said chamber and rotor, said lands having a radial spacing of between 0.01 and 0.5 inch, and means for discharging said material from said chamber outlet, whereby said material is sheared, mixed, refined and transported through said machine by the continuously crossing coaction of said grooves of said chamber and rotor walls.

6. A machine for processing viscous materials comprising a container having therein a chamber with a substantially cylindrical side wall and an inlet at one end and an outlet at the other end thereof, a substantially cylindrical rotor mounted coaxially inside said chamber with its cylindrical side wall adjacently spaced from the side wall of said chamber to leave an annular passageway therebetween, means for rotating said rotor about its axis, means for feeding material into said chamber inlet, the cylindrical side walls of said chamber and rotor being formed with alternating lands and grooves of helical shape and of opposite hands, respectively, to clear but coact with one another to feed said material axially of said chamber, the pitch of said chamber grooves being 50% to 300% greater than the pitch of said rotor grooves, to reduce the surface area of said chamber grooves, relative to the surface area of said rotor grooves, and said rotor being rotated in a direction to produce feeding of said material toward said chamber outlet by the coaction of said grooves of said chamber and rotor, said lands having a radial spacing of between 0.01 and 0.5 inch, and means for discharging said material from said chamber outlet, whereby said material is sheared, mixed, refined and transported through said machine by the continuously crossing coaction of said grooves of said chamber and rotor walls.

7. A machine as specified in claim 6, wherein the helical lands between said chamber and rotor grooves is less than 0.4 of an inch to reduce the power required for rotating said rotor.

8. A machine for processing viscous materials comprising a container having therein a chamber with a substantially cylindrical side wall and an inlet at one end and an outlet at the other end thereof, a substantially cylindrical rotor mounted coaxially inside said chamber with its cylindrical side wall adjacently spaced from the side wall of said chamber to leave an annular passageway therebetween, means for rotating said rotor about its axis, means for feeding material into said chamber inlet, the cylindrical side walls of said chamber and rotor being formed with alternating lands and grooves of helical shape and of opposite hands, respectively, to clear but coact with one another to feed said material axially of said chamber, said chamber and said rotor having multiple grooves and multiple groove leads to produce a rate of processing said material independent of the size of said grooves, and said rotor being rotated in a direction to produce feeding of said material toward said chamber outlet by the coaction of said grooves of said chamber and rotor, said lands having a radial spacing of between 0.01 and 0.5 inch, and means for discharging said material from said chamber outlet, whereby said material is sheared, mixed, refined and transported through said machine by the continuously crossing coaction of said grooves of said chamber and rotor walls.

9. A machine as specified in claim 6, having its rotor groove of generally curved shape in cross section with the material propelling side of said groove flattened and inclined at an angle to the rotor axis of between 10° and 45° to feed and compress the material against the sides of the grooves of said chamber.

10. A machine as specified in claim 9 having the groove of its chamber side walls of generally curved shape in cross section with the side of its groove toward said outlet flattened and inclined at an angle to the chamber axis of between 10 and 45° to compress, mix and refine the material fed by said rotor grooves.

11. A machine for processing viscous materials as specified in claim 9 in which said container is provided with a hopper for receiving and feeding said materials to said chamber inlet opening and with means located adjacent the periphery of said chamber and rotor at the ends thereof opposite said inlet opening for discharging from said passageway the materials refined therein.

12. A machine for processing viscous materials comprising a container having therein a chamber with a substantially cylindrical side wall and an inlet at one end and an outlet at the other end thereof, a substantially cylindrical rotor mounted coaxially inside said chamber with its cylindrical side wall adjacently spaced from the side wall of said chamber to leave an annular passageway therebetween, means for rotating said rotor about its axis, means for feeding material into said chamber inlet, the cylindrical side walls of said chamber and rotor being formed with alternating lands and grooves of helical shape and of opposite hands, respectively, to clear but coact with one another to feed said material axially of said chamber, the lead of said chamber grooves being substantially greater than the lead of said rotor grooves, whereby said material is fed through said machine faster by said chamber grooves than said rotor grooves, and said rotor being rotated in a direction to produce feeding of said material toward said chamber outlet by the coaction of said grooves of said chamber and rotor, said lands having a radial spacing of between 0.01 and 0.5 inch, and means for discharging said material from said chamber outlet, whereby said material is sheared, mixed, refined and transported through said machine by the continuously crossing coaction of said grooves of said chamber and rotor walls 13. A machine for processing viscous materials comprising a container having therein a chamber with a substantially cylindrical side wall and an inlet at one end and an outlet at the other end thereof, a substantially cylindrical rotor mounted coaxially inside said chamber with its cylindrical side wall adjacently spaced from the side wall of said chamber to leave an annular passageway therebetween, means for rotating said rotor about its axis, means for feeding material into said chamber inlet, the cylindrical side walls of said chamber and rotor being formed with alternating lands and grooves of helical shape and of opposite hands, respectively, to clear but coact with one another to feed said material axially of said chamber, and said rotor being rotated in a direction to produce feeding of said material toward said chamber outlet by the coaction of said grooves of said chamber and rotor, said lands having a radial spacing of between 0.01 and 0.5 inch, said rotor grooves being adapted to discharge said material to said chamber grooves by centrifugal force with said rotor rotated at a surface speed of from 8,000 to 12,000 feet per minute, to clear said rotor grooves and produce high refining forces in said material, and means for discharging said material from said chamber outlet, whereby said material is sheared, mixed, refined and transported through said machine by the continuously crossing coaction of said grooves of said chamber and rotor walls.

14. A machine for processing highly viscous materials comprising a container having therein a chamber with a substantially cylindrical inner side wall and an inlet at one end and an outlet at the other end thereof, a substantially cylindrical rotor mounted coaxially inside said chamber with its cylindrical side wall adjacently spaced from said inner side wall of said chamber to leave an annular passageway therebetween, means for rotating said rotor about its axis in said chamber, means for feeding said highly viscous material into said chamber inlet, the cylindrical side walls of said chamber and said rotor having alternating lands and grooves of helical shape formed rigidly thereon, the radial spacing of the lands of said chamber from the lands of said rotor being at least 0.01 inch to minimize any shearing effect between said stator lands and said rotor lands, the grooves of the chamber having a hand opposite to that of said rotor and said grooves being substantially parallel to said grooves of said rotor, said grooves of said chamber wall presenting a continuous curved surface and having a lesser total area than the corresponding grooves of said rotor surface, said rotor being rotated in a direction to produce feeding of said viscous material toward said chamber outlet by the coaction of said grooves of said chamber and said rotor, said rotor being rotated at a speed too high to act as a screw conveyor, and means for discharging said material from said chamber outlet.

References Cited by the Examiner

UNITED STATES PATENTS

| | | | |
|---|---|---|---|
| 454,790 | 6/1891 | Porter | 241—158 |
| 1,034,034 | 7/1912 | Rozelle | 241—247 X |
| 1,980,589 | 11/1934 | Acree | 241—221 X |
| 2,255,071 | 9/1941 | Marco | 241—247 X |
| 2,744,287 | 5/1956 | Parshall et al. | 241—158 |
| 2,824,500 | 2/1958 | Cumpston | 241—247 |

FOREIGN PATENTS

| | | |
|---|---|---|
| 336,005 | 10/1930 | Great Britain. |
| 371,352 | 5/1939 | Italy. |

ANDREW R. JUHASZ, *Primary Examiner.*

J. SPENCER OVERHOLSER, *Examiner.*